(No Model.)

H. D. ALEXANDER & D. HARRINGTON.
LAWN RAKE.

No. 323,252. Patented July 28, 1885.

WITNESSES:
Harry Frease
Joseph Frease

Henry D. Alexander and
David Harrington INVENTORS,

BY Fred. N. Bond

ATTORNEY

N. PETERS, Photo-Lithographer, Washington, D. C.

UNITED STATES PATENT OFFICE.

HENRY D. ALEXANDER AND DAVID HARRINGTON, OF CANTON, OHIO, ASSIGNORS OF ONE-THIRD TO MATHEW BAST, OF SAME PLACE.

LAWN-RAKE.

SPECIFICATION forming part of Letters Patent No. 323,252, dated July 28, 1885.

Application filed May 18, 1885. (No model.)

*To all whom it may concern:*

Be it known that we, HENRY D. ALEXANDER and DAVID HARRINGTON, citizens of the United States, residing at Canton, in the county of Stark and State of Ohio, have invented certain new and useful Improvements in Lawn-Rakes, of which the following is a full, clear, and exact description, reference being had to the accompanying drawings, making a part of this specification, in which—

Figure 1:
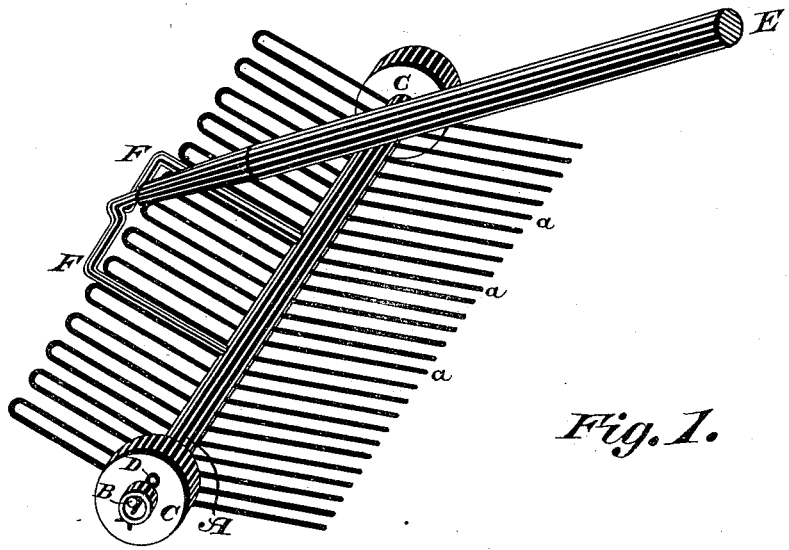
Figure 2:
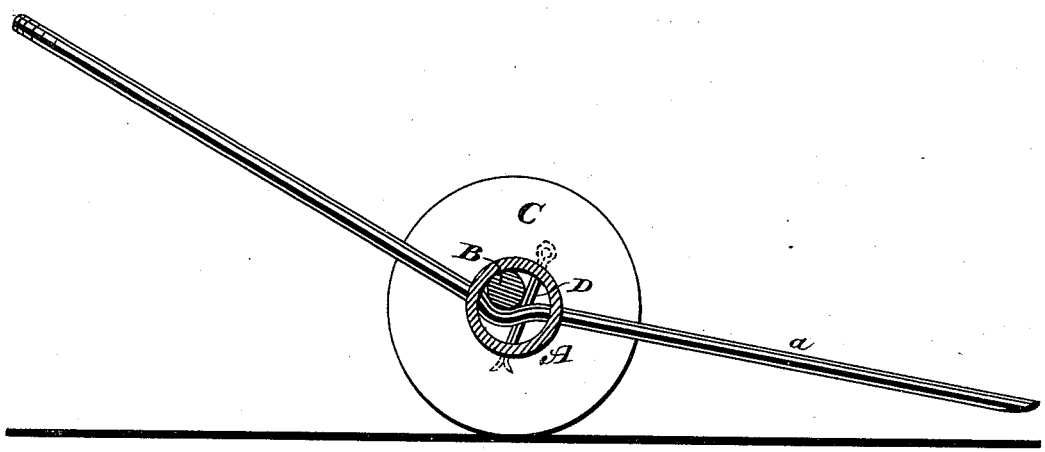

Figure 1 is a perspective view; Fig. 2 a longitudinal section.

The present invention has relation to lawn-rakes; and its nature consists in the different parts and combination of parts hereinafter described, and particularly pointed out in the claims.

Similar letters of reference indicate corresponding parts in each figure of the drawings.

In the accompanying drawings, A represents the head of the rake proper, and is made of gas-pipe, as shown in the drawings. To the head A are securely attached the teeth *a*, which are substantially of the form shown, and, as shown, the teeth are formed U-shaped, and the open end passed through the head A, as shown in the drawings, suitable holes being drilled through the head A for the passage of the teeth *a*.

The teeth *a* are securely held in proper position by means of the locking-bar B, which is driven through the head A, and is larger than the space between the inner face of the head A and the teeth *a*, so that as the bar B is forced through the head A the teeth *a* will be bent as shown in Fig. 2, thus securely holding the teeth *a* in proper position. The end of the bar B which enters the head A should be beveled so that it will pass the teeth *a* as it is being driven through. As shown, the rear ends of the teeth *a* are inclined upward so as to form a hood for the rake.

A hood may also be formed by attaching wire-gauze to the end teeth; but we prefer forming the hood as shown.

To the ends of the head A are attached the small wheels C, which are substantially of the form shown, and are for the purpose of lessening the draft of the rake, the wheels being held in proper position by means of the pins D and one of the teeth *a*.

To the head A is attached the handle E by means of the arms F, as seen in Fig. 1.

From the above description the operation of my improved device will be readily understood. The rake is operated by means of the handle E, being supported by the wheels, thus making a very light-running machine. When it is desired to discharge the rake-teeth from the grass which has been gathered and collected by them, it is accomplished by simply raising the handle, when the head and teeth will be tilted, and the grass thus allowed to fall off at the rear. No lifting of the rake from the ground is necessary, the head turning in the wheels C, as will be obvious.

Having now fully described our invention, what we claim as new, and desire to secure by Letters Patent, is—

1. A lawn-rake consisting of a head mounted upon wheels and provided with an operating-handle, and rake-teeth passed through apertures in said head and secured thereto at or about their centers, substantially as described.

2. In a lawn-rake, the combination, with a tubular head mounted upon wheels and provided with an operating-handle, of rake teeth passing through apertures in said tubular head, and a locking-bar passed longitudinally through said tubular head for holding the teeth in position, substantially as described.

3. In a lawn-rake, the combination, with a head mounted upon wheels and provided with an operating-handle, of U-shaped rake-teeth consisting of metal wires bent over as shown and the free ends passed through apertures in the said head and secured therein so as to project equally in front and rear thereof, substantially as described.

In testimony that we claim the above we have hereunto subscribed our names in the presence of two witnesses.

H. D. ALEXANDER.
          DAVID HARRINGTON.

Witnesses:
    FRED W. BOND,
    EDWIN F. FREASE.